(No Model.) 2 Sheets—Sheet 1.

R. B. DISBROW.
COMBINED CHURN AND BUTTER WORKER.

No. 582,621. Patented May 18, 1897.

Witnesses.
C. F. Kilyn
F. D. Merchant

Inventor.
Reuben B. Disbrow.
By his Attorney.
Jas. F. Williamson

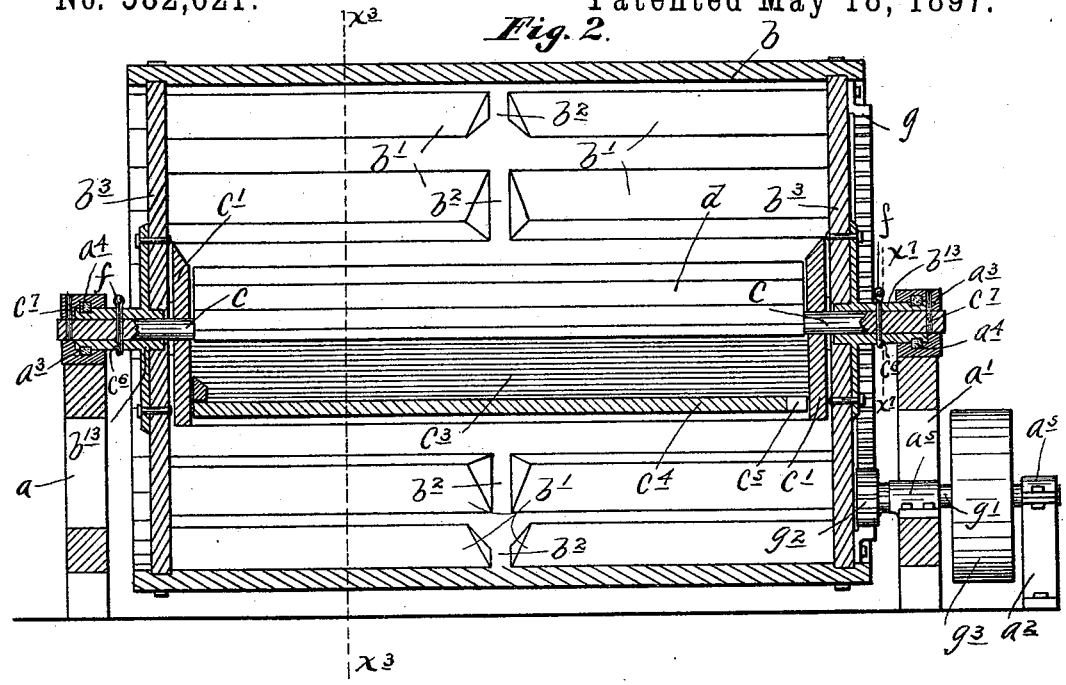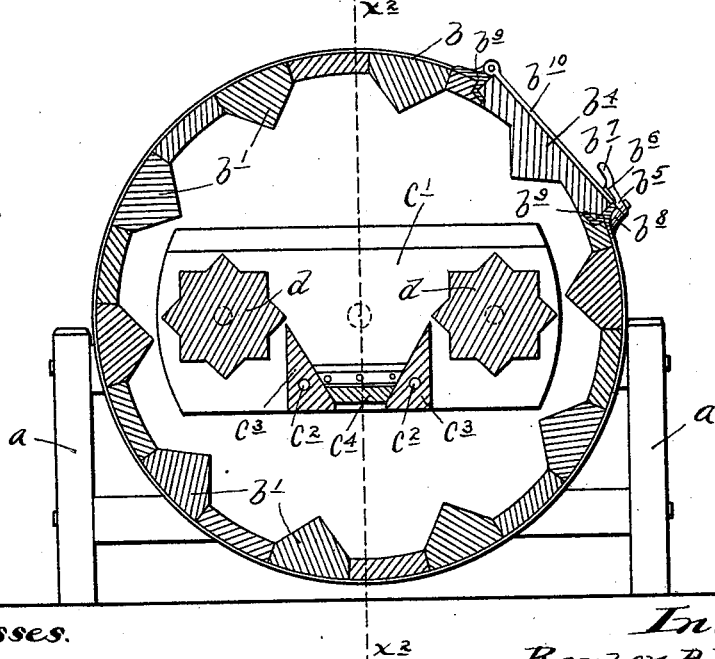

UNITED STATES PATENT OFFICE.

REUBEN B. DISBROW, OF OWATONNA, MINNESOTA.

COMBINED CHURN AND BUTTER-WORKER.

SPECIFICATION forming part of Letters Patent No. 582,621, dated May 18, 1897.

Application filed July 11, 1896. Serial No. 598,856. (No model.)

*To all whom it may concern:*

Be it known that I, REUBEN B. DISBROW, a citizen of the United States, residing at Owatonna, in the county of Steele and State of Minnesota, have invented certain new and useful Improvements in a Combined Churn and Butter-Worker; and I do hereby declare the following to be a full, clear, and exact description of the invention, such as will enable others skilled in the art to which it appertains to make and use the same.

My invention relates to combined churns and butter-workers, and has for its object to improve the construction of this class of machines with a view to greater efficiency, convenience, economy, and simplicity of construction.

The machine hereinafter illustrated is especially designed to be operated by motive power for use in creameries or elsewhere where large quantities are to be churned at one time; but the machine may be made of a size suitable for operation by hand for small dairies or home use. The machine is also capable of use for other purposes, such as kneading dough, &c.

To the ends above noted my invention consists of the novel devices and combinations of devices hereinafter described, and defined in the claims.

The preferred form of my invention is illustrated in the accompanying drawings, wherein, like letters referring to like parts throughout the several views—

Figure 1:
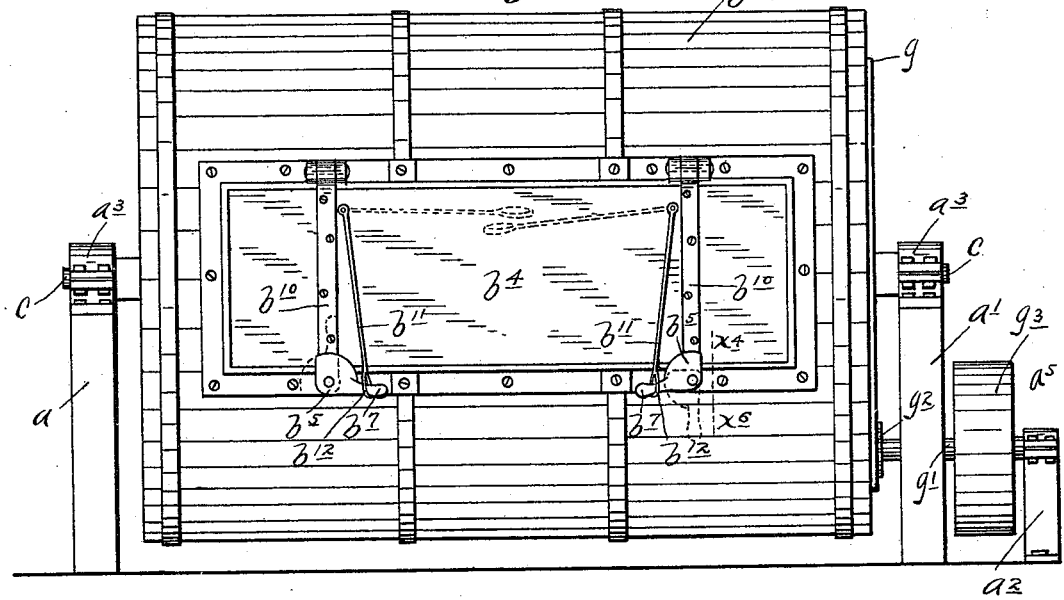
Figure 4:
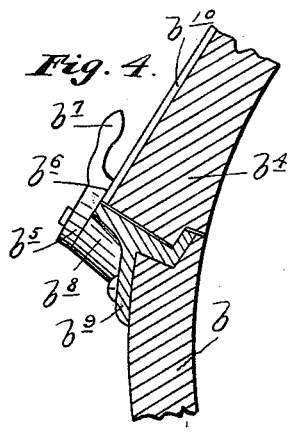
Figure 5:
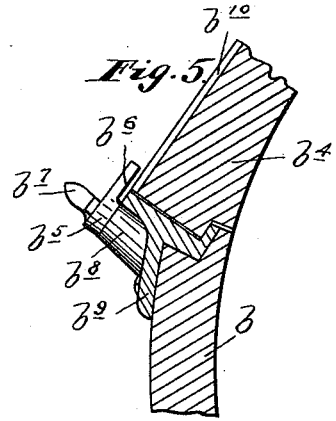
Figure 6:
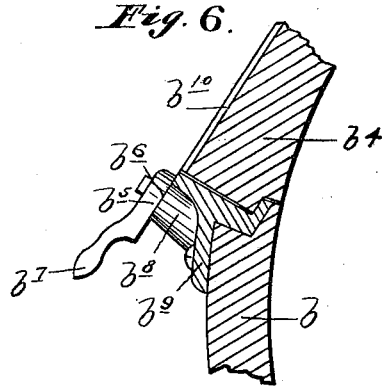
Figure 7:
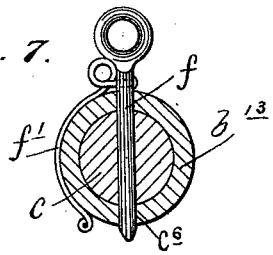

Figure 1 is a side elevation of a churn constructed in accordance with my invention. Fig. 2 is a vertical longitudinal section taken substantially on the line $x^2\ x^2$ of Fig. 3. Fig. 3 is a transverse vertical section taken substantially on the line $x^3\ x^3$ of Fig. 2. Figs. 4, 5, and 6 are views taken through a portion of the machine-drum substantially on the line $x^4\ x^6$ of Fig. 1, but illustrating different positions of cam-clamp for securing the door of the drum; and Fig. 7 is a detail view taken substantially on the line $x^7\ x^7$ of Fig. 2.

$a\ a'\ a^2$ represent frame-sections or pillow-blocks, in which the rotary drum or cylinder and the driving connections to the same are mounted.

The body of the drum or cylinder $b$ is provided on its interior with cleats $b'$, the projecting portions of which are V-shaped and the central portions of which are cut away, as shown at $b^2$, to form a channel or circulating-passage, through which the liquid in the drum may freely run toward the bottom of the same. The ends of the drum $b$ are closed by tight heads $b^3$, and the body of the same
is provided with a door $b^4$, which is secured in working position by means of pivoted cam-clamps $b^5$. These cam-clamps $b^5$ are segmental in form and are provided with the cam-surfaces $b^6$ and handpieces $b^7$. As shown, the clamps $b^5$ are pivoted to lugs $b^8$ of the fixed door-casing $b^9$, and the cam-surfaces $b^6$ are arranged to coöperate with the hinge-irons $b^{10}$ of the door $b^4$. When the lowest portion of the cam-surface $b^6$ of one of the clamps $b^5$ is moved onto the coöperating hinge-iron $b^{10}$, as shown in Fig. 4, the door $b^4$ will be held closed with a liquid-tight joint. When, however, the lowest portion of the cam-surfaces $b^6$ of the clamps $b^5$ are turned opposite to the co-operating hinge-irons $b^{10}$, as shown in Figs. 1 and 5, the door $b^4$ is free to open slightly, so that any liquid which may then be in the drum may, as the drum revolves, gradually run off through the open crack in the door.

When the clamps are turned, as shown in Fig. 4, the friction of the cam-surfaces $b^6$ on the hinge-irons $b^{10}$ will prevent them from turning or rattling out of their locking positions. When, however, they are turned, as shown in Figs. 1 and 5, it requires some special provision to hold the clamps in position. This I accomplish by means of pivoted rods $b^{11}$, the pivoted ends of which, as shown, are secured to the door $b^4$, and the free ends of which are provided with eyes $b^{12}$, which are adapted to engage over the handpieces $b^7$ of the catches $b^5$, and thus to hold said catches as set. The pivoted rods $b^{11}$ are preferably secured at their pivoted ends under sufficient friction to hold the rods wherever set, and when out of use may be turned out of the way, as shown by dotted lines in Fig. 1.

To the centers of the drum-heads $b^3$ are rigidly secured outwardly-projecting hollow trunnions $b^{13}$, the outer ends of which work in bearing-boxes $a^3$, one on the frame-section $a$ and the other on the frame-section $a'$. After the ends of the trunnions $b^{13}$ have been placed in working position within their respective boxes $a^3$ they may be held from endwise movement by means of Babbitt rings $a^4$, run into grooves formed in the said parts.

Running through the bearings $a^3$ and hollow trunnions $b^{13}$ and projecting into the interior of the drum is a pair of short shafts $c$. On the inner ends of each of these shafts $c$ is secured a head or supporting section $c'$. Running longitudinally of the drum, just below the centers of the heads or supports $c'$ and secured thereto by longitudinal tie-bolts $c^2$, are a pair of parallel trough-sections $c^3$. These trough-sections $c^3$ of themselves form a trough with an open bottom and upwardly-diverging inner side walls. The trough thus formed is provided with a removable bottom piece $c^4$, one end of which is provided with a finger-notch $c^5$, which permits the operator to get a good hold on the same in removing the bottom.

Loosely mounted in the ends of the head $c'$, one on each side of the trough $c^3$, is a pair of corrugated rollers $d$. The centers of these rollers $d$ are preferably arranged substantially on a line passing through the center of the shaft-sections $c$ and over the top edge of the trough-pieces $c^3$, and the points of the ribs formed on the face of said rollers are arranged with but a slight clearance from the upper edges of said trough-pieces $c^3$ and the inner points of the drum-cleats $b'$.

The shaft-sections $c$ and the hollow trunnions $b^{13}$ are provided with diametrical perforations or pin-seats $c^6$, and said shaft-sections $c$ and the bearing-boxes $a^3$ are provided with diametrical perforations $c^7$, which perforations are adapted to coöperate in pairs, as indicated.

$f$ indicates lock-pins which are adapted to be inserted into either of the coöperating pairs of perforations or lock-pin seats $c^6$ $c^7$ in a manner and for a purpose which will later appear. Preferably these lock-pins $f$ are provided with spring retaining-fingers $f'$, which are secured to said pins at one of their ends and are bent in the form of a bow or semicircle. As indicated particularly in Fig. 7, when the pin $f$ is placed in working position the spring-finger $f'$ will embrace the cylindrical surface of the hub or bearing portions through which the pin is inserted, and thus hold the pin from accidental displacement.

To the outer face of one of the drum ends $b^3$ is rigidly secured an annular internal gear $g$. In suitable bearings $a^5$ on the frame-sections $a'$ $a^2$ is loosely mounted a short shaft $g'$, to the inner end of which is rigidly secured a pinion $g^2$, which is in mesh with the annular gear $g$, and on said shaft $g'$, between the frame-sections $a'$ and $a^2$, is secured a pulley $g^3$. Motion is imparted to the drum $b$ from a power-driven belt (not shown) which runs over the pulley $g^3$.

The operation of the machine is substantially as follows: In the churning action the lock-pins $f$ are inserted into seats $a^6$ of the shaft $c$ and the hollow trunnions $b^{13}$. This will of course cause the supports or heads $c'$, trough-sections $c^3$, and rollers $d$ to rotate with the drum or cylinder $b$. In this action, however, the removable bottom $c^4$ of the butter-trough should be removed. Supposing the drum to be filled with cream to the proper extent and the door $b^4$ to be tightly closed, then by rotating the drum in either direction the cream will be kept in a constant state of agitation until the separation is effected and the butter has come. In this churning action the cream not only receives a beating action directly from the cleats $b'$, but is carried up thereby to a point above the normal level of the body of cream and is thrown thereby radially and downward with a dashing action, and as it thus falls it will be again struck and dashed by the rollers $d$ and trough-sections $c^3$. In fact, as the cream is thus dropped or dashed downward it will first be struck by the advance member of the rollers $d$, from whence it will fall onward toward the bottom of the drum, where it will be again struck and dashed by the other roller $d$. It will thus be seen that the cream is kept in a constant state of agitation and is never allowed to rest or settle into a body. When the separation has been completed, the buttermilk drawn off, and the butter salted and put into condition for working, the door $b^4$ should be secured by means of the catches $b^5$, as shown in Figs. 1 and 5, in which position the said door is free to open slightly, so as to let the briny water which is squeezed from the butter in the butter-working action gradually run off from the drum. The manner in which these spring-catches $f^5$ are thus held has already been fully described. Before commencing the butter-working action, however, the lock-pins $f$ should be removed from the coöperating seats or perforations $c^6$ and should then be placed in the coöperating perforations or seats $c^7$ of the shaft $c$ and bearings $a^4$, and the head-pieces $c$, together with the parts carried thereby, locked in the position shown in Fig. 3. The removable bottom piece $c^4$ should then of course be placed in working position in the bottom of the butter-trough. Then by continuing the rotation of the drum the butter-working action will begin. In this butter-working action the collected particles of butter will first be carried upward by the cleats $b'$ into engagement with the corrugations of the particular roller $d$, which is located on the side of the drum, which is moving upward, and this roller will be caused to revolve and throw the butter engaged thereby into the butter-trough $c^3$ $c^4$. As this action continues the butter will be piled or accumulated in the trough, and will by the action of the roller which delivered the same be packed and pressed into a comparatively solid mass. As the butter is passed between the cleats $b'$ of the drum $b$ and the corrugations of the roller $d$ it will be tightly pressed or packed, so that it will be entirely freed from briny water.

The salient distinction between this churn and all churns which have preceded it resides in the fact that both in the churning and in the butter-working action the drum may be run in either direction with equal effect and efficiency. The construction whereby this is accomplished has already been made clear, and the advantages derived from it are of great importance. One advantage is that it greatly reduces and simplifies the driving-gearing for rotating the drum by removing the necessity of a reversing-gear for reversing the movement in the drum when the machine is converted in its use from a churn to a butter-worker, or vice versa. Again, the power-shaft from which the churn is to be run is usually already given a predetermined direction of rotation. With the old forms of machines it has therefore been necessary, in order to give the drum the right direction of rotation, (when the power-shaft is found to run in the wrong direction to give the proper action,) to turn the machine end for end, or else to provide some means for reversing the positions of the parts within the churn. In my present invention no one of these difficulties is encountered.

It will be understood, of course, that various alterations in the details of construction of the preferred form of my invention above described may be made without departing from the broad principles of my invention.

What I claim, and desire to secure by Letters Patent of the United States, is as follows:

1. The combination with a rotary drum, of a support inside of the drum, a butter-trough supported by said support, one or more coöperating rollers mounted in said support, and means for securing said support against rotary movement with said drum, substantially as described.

2. The combination with a rotary drum, of a support inside of the drum, a butter-trough and a pair of coöperating rollers supported by said support, one on each side of said trough, and means for securing said support against rotary movement with said drum, substantially as described.

3. The combination with a rotary drum, of supports inside of the drum, a butter-trough supported by said support, one or more coöperating loose rollers carried by said support, means for causing said supports to move with said drum, in the churning action, and means for securing said supports against rotary movement with said drum, in the butter-working action, substantially as described.

4. The combination with a rotary drum, of a pair of heads or supports inside of the drum, a butter-trough secured centrally to said supports or heads and provided with a removable bottom, a pair of coöperating loose rollers mounted in said supports, one on each side of said trough, means for causing said supports or heads to move with said drum, and means for securing the same against rotary movement with said drum, at will, substantially as described.

5. The combination with suitable supports involving the bearings $a^3$, of the drum $b$ with heads $b^3$, provided with hollow trunnions $b^{13}$, the short shafts $c$, the coöperating pin-seats $c^6$ and $c^7$ formed respectively in said shafts $c$ and trunnions $b^{13}$ and in said shaft $c$ and said bearings $a^3$, the head-supports $c'$ fixed on the inner ends of the shaft $c$, the trough-sections $c^3$ secured to said heads $c'$ and provided with the removable bottom $c^4$, the pair of corrugated rollers $d$ loosely mounted in the ends of said heads $c'$, and the lock-pin $f$ adapted for engagement with the lock-seats $c^6$ and $c^7$, substantially as described.

6. The combination with the drum $b$ provided with the hinged door $b^4$, of one or more pivoted catches $b^5$, cut away at $b^6$, and provided with handles or end piece $b^7$ and the retaining-rods $b^{11}$ provided with eyes $b^{12}$ at their free ends adapted to engage the finger portions $b^7$ of said catches, substantially as described.

In testimony whereof I affix my signature in presence of two witnesses.

REUBEN B. DISBROW.

Witnesses:
S. S. GREEN,
J. W. ROWLAND.